United States Patent [19]
Horton et al.

[11] Patent Number: 5,985,482
[45] Date of Patent: Nov. 16, 1999

[54] SNAP-ON BATTERY HEAT SHIELD

[75] Inventors: Anthony Horton, Minneapolis; John Miller, Mendota Heights; William H. Kump, West St. Paul; Steven Peterson, Minneapolis, all of Minn.

[73] Assignee: GNB Technologies, Inc., Mendota Heights, Minn.

[21] Appl. No.: 09/067,833

[22] Filed: Apr. 28, 1998

[51] Int. Cl.$^6$ ................................................. H01M 2/10
[52] U.S. Cl. ............................ 429/97; 429/96; 429/100; 429/148; 429/177; 429/178; 429/187
[58] Field of Search ............................... 429/148, 96, 97, 429/100, 175, 177, 178, 179, 187

[56] References Cited

U.S. PATENT DOCUMENTS

| | | | |
|---|---|---|---|
| 3,110,633 | 11/1963 | Bachmann | 136/161 |
| 3,408,234 | 10/1968 | Ririe, Jr. | 136/181 |
| 3,825,447 | 7/1974 | Kraals | 136/166 |
| 4,006,280 | 2/1977 | Walker et al. | 429/98 |
| 4,007,315 | 2/1977 | Brinkmann et al. | 429/62 |
| 4,054,730 | 10/1977 | Crifasi | 429/120 |
| 4,107,402 | 8/1978 | Dougherty et al. | 429/120 |
| 4,126,734 | 11/1978 | Walters | 429/71 |
| 4,169,918 | 10/1979 | Moore | 429/57 |
| 4,237,202 | 12/1980 | Karpal | 429/120 |
| 4,255,502 | 3/1981 | Taylor, III | 429/163 |
| 4,275,131 | 6/1981 | Richards | 429/163 |
| 4,278,742 | 7/1981 | Oxenreider et al. | 429/88 |
| 4,314,008 | 2/1982 | Blake | 429/8 |
| 4,371,591 | 2/1983 | Oxenreider et al. | 429/88 |
| 4,409,051 | 10/1983 | Ciliberti, Jr. | 156/212 |
| 4,444,853 | 4/1984 | Halsall et al. | 429/54 |
| 4,486,515 | 12/1984 | Chern | 429/72 |
| 4,517,263 | 5/1985 | Reiss et al. | 429/120 |
| 4,522,898 | 6/1985 | Esrom | 429/120 |
| 4,523,658 | 6/1985 | Maki | 180/68.5 |
| 4,562,128 | 12/1985 | Humphreys et al. | 429/178 |
| 4,563,402 | 1/1986 | Kobayashi et al. | 429/178 |
| 4,572,878 | 2/1986 | Daugherty | 429/62 |
| 4,579,790 | 4/1986 | Humphreys et al. | 429/65 |
| 4,600,665 | 7/1986 | Sanders | 429/120 |
| 4,634,642 | 1/1987 | Lopez-Doriga | 429/121 |
| 4,666,800 | 5/1987 | Bechtold et al. | 429/175 |
| 4,693,949 | 9/1987 | Kellett et al. | 429/178 |
| 4,699,855 | 10/1987 | Abraham et al. | 429/175 |
| 4,724,190 | 2/1988 | Siga et al. | 429/158 |
| 4,752,543 | 6/1988 | Anderson et al. | 429/179 |
| 4,756,978 | 7/1988 | Nitcher et al. | 429/1 |
| 4,770,957 | 9/1988 | Miyagawa | 429/175 |
| 4,770,958 | 9/1988 | Newman et al. | 429/177 |
| 4,778,074 | 10/1988 | Kelly | 220/4 R |
| 4,808,495 | 2/1989 | Goldstein | 429/175 |
| 4,830,937 | 5/1989 | Clerici | 429/120 |
| 4,840,855 | 6/1989 | Foti et al. | 429/120 |
| 4,857,422 | 8/1989 | Stocchiero | 429/175 |
| 4,865,928 | 9/1989 | Richter | 429/120 |
| 4,873,159 | 10/1989 | Ciriello | 429/120 |
| 4,892,783 | 1/1990 | Brazel | 428/282 |
| 4,894,295 | 1/1990 | Cheiky | 429/77 |
| 4,897,322 | 1/1990 | Jessen | 429/62 |
| 4,942,963 | 7/1990 | Gibellini | 206/333 |
| 4,952,468 | 8/1990 | Abraham et al. | 429/175 |
| 4,966,346 | 10/1990 | Kärnä et al. | 248/503 |
| 4,976,327 | 12/1990 | Abujudom, II et al. | 180/68.2 |
| 5,015,545 | 5/1991 | Brooks | 429/99 |
| 5,031,712 | 7/1991 | Karolek et al. | 180/68.2 |
| 5,039,927 | 8/1991 | Centafanti | 320/2 |

(List continued on next page.)

*Primary Examiner*—Maria Nuzzolillo
*Assistant Examiner*—Tracy Dove
*Attorney, Agent, or Firm*—Leydig, Voit & Mayer, Ltd.

[57] ABSTRACT

A unitarily molded, snap-on heat shield for a standard automotive battery container having handle brackets extending from opposing side walls of the container, the heat shield having wedge-shaped coupling protrusions extending inwardly from cantilevered flaps in the heat shield side walls, the wedge-shaped protrusions riding along the handle brackets to cantilever the flaps away for the container side wall as the shield in moved downward over the container, the flaps snapping back inward toward the battery container as the protrusions pass the handle bracket to couple the heat shield to the battery container.

20 Claims, 4 Drawing Sheets

U.S. PATENT DOCUMENTS

| | | | |
|---|---|---|---|
| 5,051,322 | 9/1991 | Hasenauer | 429/120 |
| 5,082,075 | 1/1992 | Karolek et al. | 180/68.2 |
| 5,086,860 | 2/1992 | Francis et al. | 180/68.5 |
| 5,131,559 | 7/1992 | Ariyoshi et al. | 220/555 |
| 5,141,826 | 8/1992 | Böhm et al. | 429/120 |
| 5,187,031 | 2/1993 | Heiman et al. | 429/129 |
| 5,202,200 | 4/1993 | McMillan, Jr. et al. | 429/187 |
| 5,209,991 | 5/1993 | Stocchiero | 429/66 |
| 5,212,025 | 5/1993 | Shibata et al. | 429/120 |
| 5,215,834 | 6/1993 | Reher et al. | 429/62 |
| 5,227,266 | 7/1993 | Shaffer et al. | 429/160 |
| 5,246,793 | 9/1993 | Scott | 429/99 |
| 5,278,002 | 1/1994 | Hiers | 429/175 |
| 5,278,003 | 1/1994 | Francisco | 429/175 |
| 5,281,492 | 1/1994 | Lin | 429/84 |
| 5,283,137 | 2/1994 | Ching | 429/175 |
| 5,293,951 | 3/1994 | Scott | 180/68.5 |
| 5,320,190 | 6/1994 | Naumann et al. | 180/68.2 |
| 5,324,597 | 6/1994 | Leadbetter et al. | 429/62 |
| 5,356,735 | 10/1994 | Meadows et al. | 429/120 |
| 5,376,479 | 12/1994 | Gerner | 429/204 |
| 5,415,956 | 5/1995 | Ching | 429/187 |
| 5,424,146 | 6/1995 | Lin | 429/84 |
| 5,437,939 | 8/1995 | Beckley | 429/99 |
| 5,441,123 | 8/1995 | Beckley | 180/68.5 |
| 5,443,926 | 8/1995 | Holland et al. | 429/120 |
| 5,449,571 | 9/1995 | Longardner et al. | 429/120 |
| 5,460,900 | 10/1995 | Rao et al. | 429/72 |
| 5,484,667 | 1/1996 | Sahli et al. | 429/100 |
| 5,492,779 | 2/1996 | Ronning | 429/120 |
| 5,516,600 | 5/1996 | Cherng | 429/62 |
| 5,518,806 | 5/1996 | Eder et al. | 428/218 |
| 5,536,595 | 7/1996 | Inkmann et al. | 429/120 |
| 5,542,489 | 8/1996 | Allison et al. | 180/68.5 |
| 5,543,248 | 8/1996 | Dougherty et al. | 429/163 |
| 5,547,036 | 8/1996 | Gawaskar et al. | 180/68.5 |
| 5,549,986 | 8/1996 | Heiman et al. | 429/175 |
| 5,569,552 | 10/1996 | Rao et al. | 429/72 |
| 5,578,393 | 11/1996 | Haskins | 429/120 |
| 5,585,204 | 12/1996 | Oshida et al. | 429/62 |
| 5,620,057 | 4/1997 | Kleman et al. | 180/68.5 |
| 5,626,982 | 5/1997 | Kawai et al. | 429/120 |
| 5,641,589 | 6/1997 | Grivel et al. | 429/120 |
| 5,645,954 | 7/1997 | Tamaru | 429/100 |
| 5,645,957 | 7/1997 | Misra et al. | 429/163 |
| 5,663,007 | 9/1997 | Ikoma et al. | 429/53 |
| 5,673,794 | 10/1997 | Kuipers et al. | 206/703 |
| 5,681,668 | 10/1997 | Reed et al. | 429/100 |
| 5,683,830 | 11/1997 | Fritts et al. | 429/84 |
| 5,686,202 | 11/1997 | Hooke et al. | 429/160 |
| 5,691,076 | 11/1997 | Poe | 429/53 |
| 5,709,967 | 1/1998 | Larsen | 429/175 |
| 5,731,100 | 3/1998 | Fritts et al. | 429/84 |
| 5,736,272 | 4/1998 | Veenstra et al. | 429/99 |

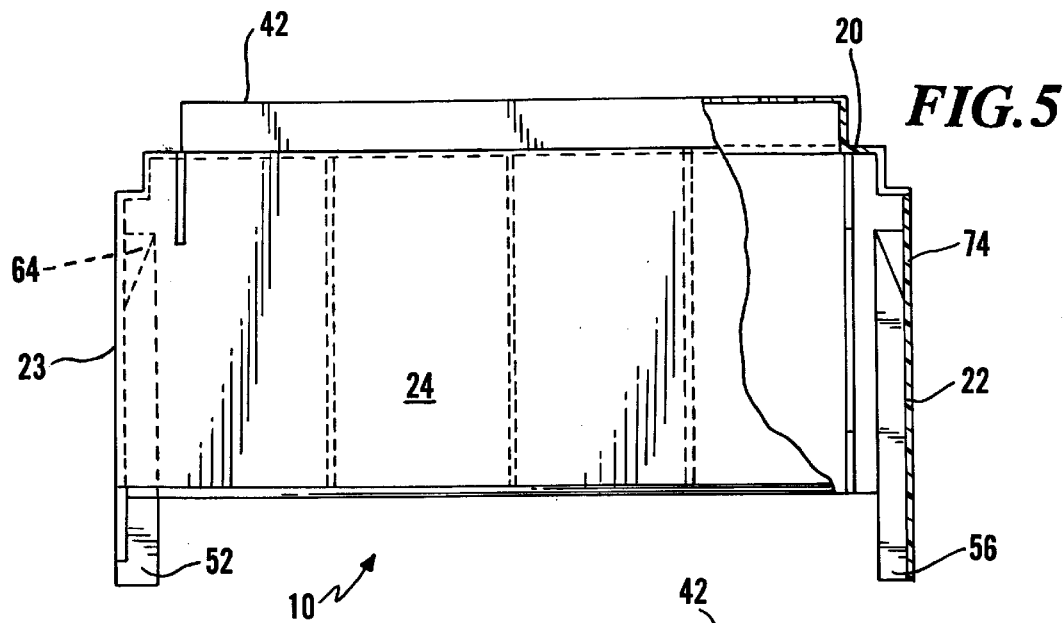
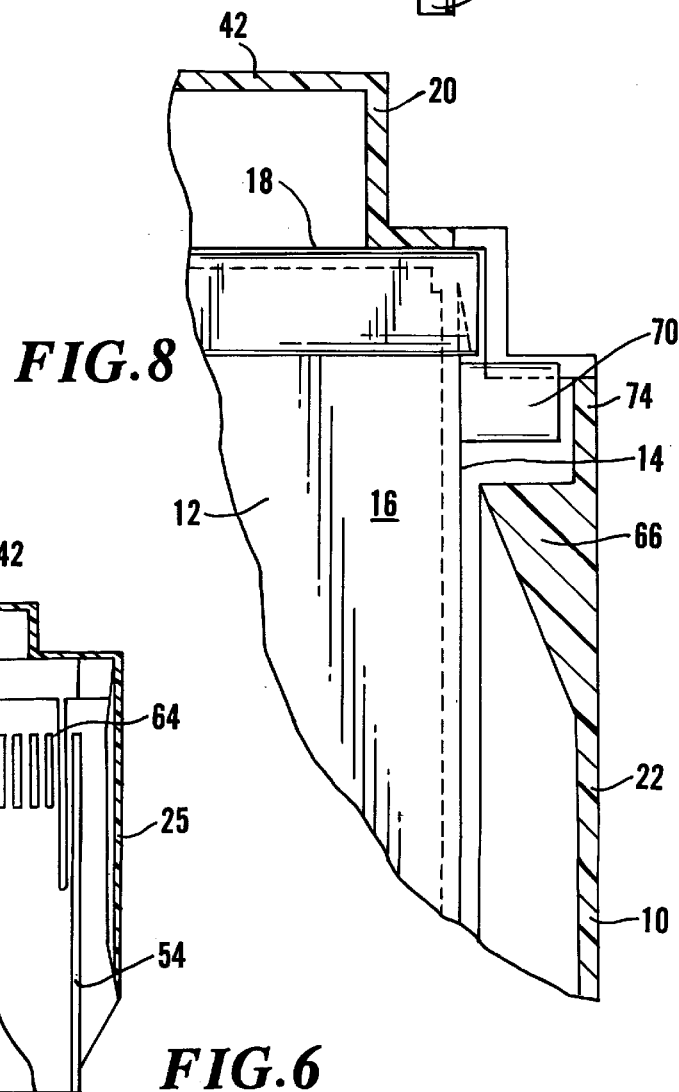

SNAP-ON BATTERY HEAT SHIELD

FIELD OF THE INVENTION

The invention relates to storage batteries for motor vehicles, and more particularly to a heat shield enclosure for protecting such batteries from hot underhood temperatures.

BACKGROUND OF THE INVENTION

The underhood temperature of a motor vehicle can reach 200° F. during operation, and even 230° F. in extremely hot environmental conditions. Subjecting storage batteries to such excessive temperatures accelerates corrosion of the battery grids, which is a major factor in shortening of battery life. Consequently, the automotive industry has long recognized the need to protect the batteries in motor vehicles from the hot temperatures present in the engine compartment during operation.

Vehicle batteries are conventionally protected from underhood heating by the placement of an insulting shell or shield over the battery. Generally, the shield acts as an insulator. For example, U.S. Pat. No. 5,278,002 to Hiers discloses a box-like battery shield with attachable envelopes of plastic material containing insulation. The heat shield is coupled to the battery by a friction fit along the top and sides of the battery. U.S. Patent to Longardner et al. discloses the encapsulation of a battery with a phase change material. Alternately, the shield may be designed to provide an air gap between the sidewalls of the battery and the shield through which cooler outside air is circulated either by fan or as the result of vehicle motion.

Some insulating shells are designed to be mounted on the battery after it has been installed in the vehicle. For example, U.S. Pat. No. 5,086,860 to Francis et al. discloses a tray upon which the battery is disposed and over which a box placed. The box is secured to the tray by an L-shaped bracket, which extends over the top and one side of the box.

Other heat shields are designed to be assembled onto the battery prior to vehicle installation. It is generally recognized in the automotive industry that creating such a subassembly prior to the final assembly line can reduce overall costs.

For example, U.S. Pat. No. 5,212,025 to Osamu Shibata et al. discloses a storage battery for automobiles which includes a heat shield that is designed to be a part of the battery assembly, making it easier to mount the battery in an automobile. The heat shield is a box-like structure having a closed bottom and which is open at the top to permit the battery to be positioned within the heat shield. The arrangement requires a non-standard cover for the battery to define the air gap and a non-standard container to provide the latching recesses in its for securing the heat shield to the battery. Further, because the heat shield has a closed bottom, the battery must be lifted in order to position it within the heat shield. In addition, this arrangement requires modification of the battery hold down tray and hold down hardware.

U.S. Pat. No. 5,543,248 to Dougherty et al. discloses a clam shell type designs wherein front and rear section halves are coupled to a base by living hinges, or coupled to each other by living hinges. U.S. Pat. No. 5,536,595 to Inkmann et al. and U.S. Pat. No. 4,054,730 to Crifasi disclose a similar two part heat shields which slide onto the battery along its opposite sides to surround the four sides of the battery, the top and bottom being open. The halves are secured together by latches along opposite sides.

While such clam shell shields may be injection molded on a production scale, a number of disadvantages are associated with such clam shell designs. The battery must be assembled into the clamshell prior to assembly into the vehicle. Clamshell side latches are typically not robust enough to assure that shield will remain locked to the battery during installation into the vehicle. Additionally, it is difficult for one person to remove a clam shell heat shield. One person must hold the clamshell open while another removes the battery from the open shield. Further, clamshell designs do not generally lend themselves to easy manual or automated assembly. This results in excessive cost and/or effort to implement on a production basis. Also, clamshells do not typically cover the top of the battery. Covering the top of a battery, however, is critical in extreme operating conditions.

OBJECTS OF THE INVENTION

It is a primary object of the invention to provide a heat shield for an existing automotive battery that does not interfere with conventional holddown devices. Related objects of the invention are to provide a shield that may be easily assembled to and disassembled from the battery by one person and wherein the assembly may be readily automated.

It is a further object of the invention is to provide a heat shield that may be attached by a snap-fit to the battery.

It is another object of the invention is to provide a battery shield that may be assembled to a battery to create a subassembly prior to assembly into the engine of a vehicle or that may be assembled onto a battery already assembled into the engine of a vehicle.

It is yet another object of the invention to provide a heat shield that provides thermal stability and acts as a splash shield against possible acid expulsion from the battery under extreme operating conditions.

SUMMARY OF THE INVENTION

In accomplishing these and other objectives of the invention, the invention provides a unitarily molded heat shield that may be used with a standard automotive battery container having handle brackets extending from opposing sidewalls or end walls of the container. For the purposes of this disclosure, the term "sidewall" will be used as a generic term for side walls and end walls both with regard to the battery and the enclosure or heat shield. The sidewalls of the heat shield and preferably, the top wall of the heat shield are spaced away from the sidewalls and top wall of the battery container to provide an insulating air gap. To couple the heat shield to the battery container, the heat shield includes wedge-shaped coupling protrusions extending inwardly from opposed sidewalls of the heat shield. The opposed sidewalls further comprise cantilevered flaps upon which the protrusions are disposed. Preferably, the protrusions are wedge shaped, so that the wedge rides along the handle brackets to cantilever the flaps away for the container side wall as the shield in moved downward over the container. When the protrusions pass beyond the handle brackets, the flaps snap back inward toward the battery container to position the protrusions subjacent the handle bracket to couple the heat shield to the battery container. To remove the heat shield from the battery container, the flaps are flexed outward from the battery to disengage the protrusions from the handle bracket. Then the heat shield may be easily lifted from the battery container.

Spacing protrusions may be provided, extending inwardly from the sidewalls of the battery to keep the heat shield from shifting once in place on the battery. The top wall of the heat shield may additionally include openings for receiving the battery terminals and for viewing a state of charge indicator. The top wall may also include a raised or protruding portion for receiving the battery vents.

DESCRIPTION OF THE DRAWINGS

FIG. 5 is a side view of the heat shield of FIG. 2, partially broken away to show the inside of the battery cover.

FIG. 6 is an end view of the heat shield of FIG. 2, partially broken away to show the inside of the battery cover.

FIG. 8 is an enlarged fragmentary view of the corner of the battery and the heat shield coupling of FIG. 2.

DESCRIPTION OF THE PREFERRED EMBODIMENT

Figure 1:
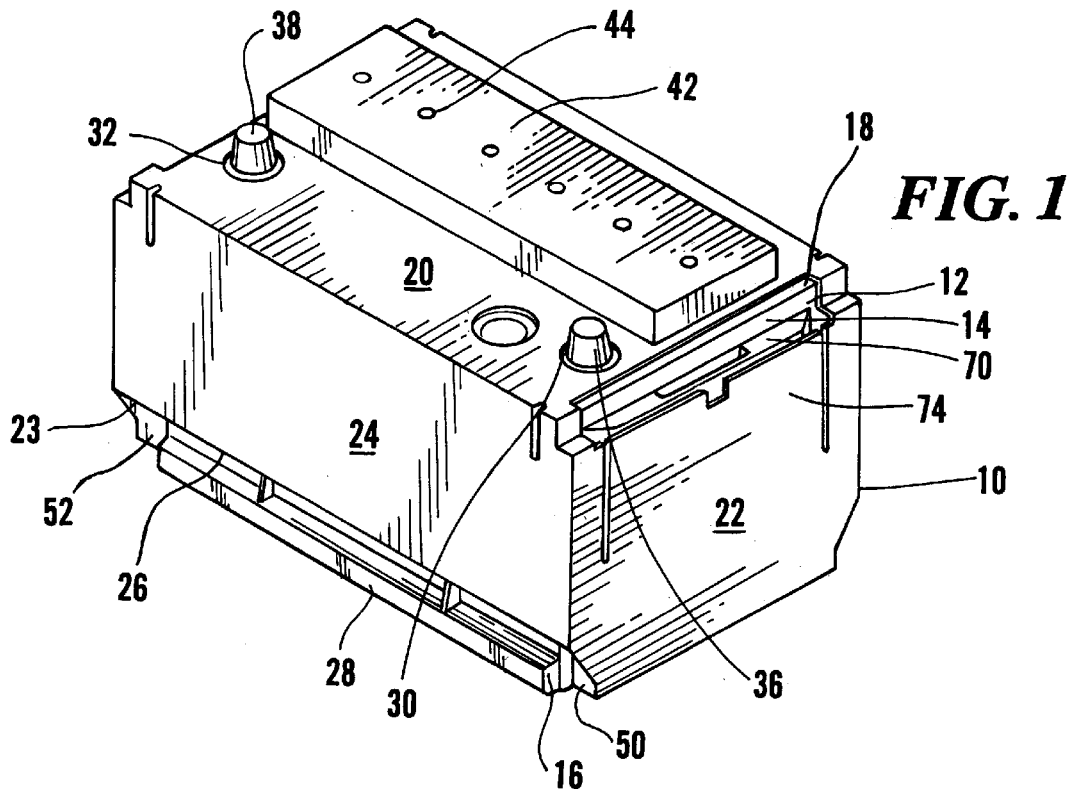
FIG. 1 is a perspective view of a heat shield constructed in accordance with teachings of the invention assembled onto a battery container.
Figure 3:
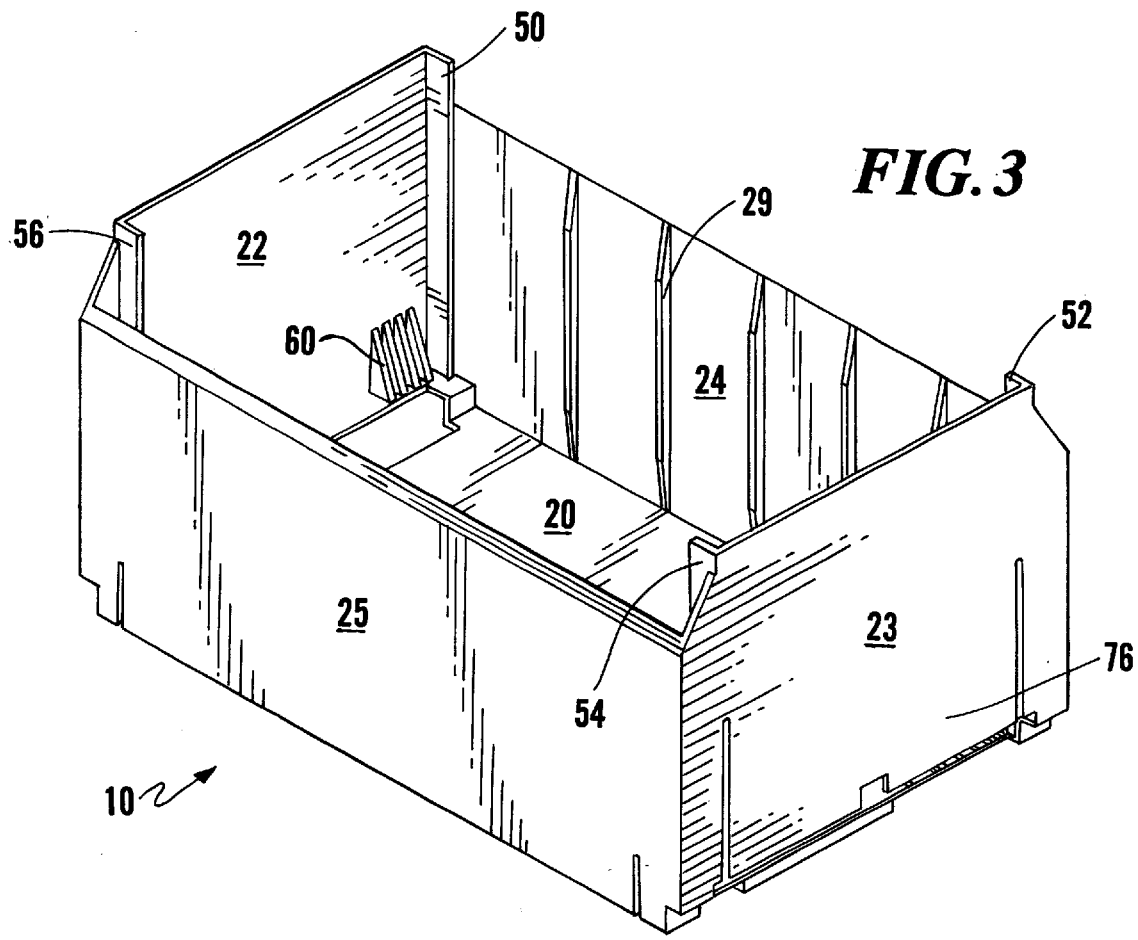
FIG. 3 is an enlarged perspective view of the heat shield of FIG. 2 showing the inside of the heat shield.
Figure 4:
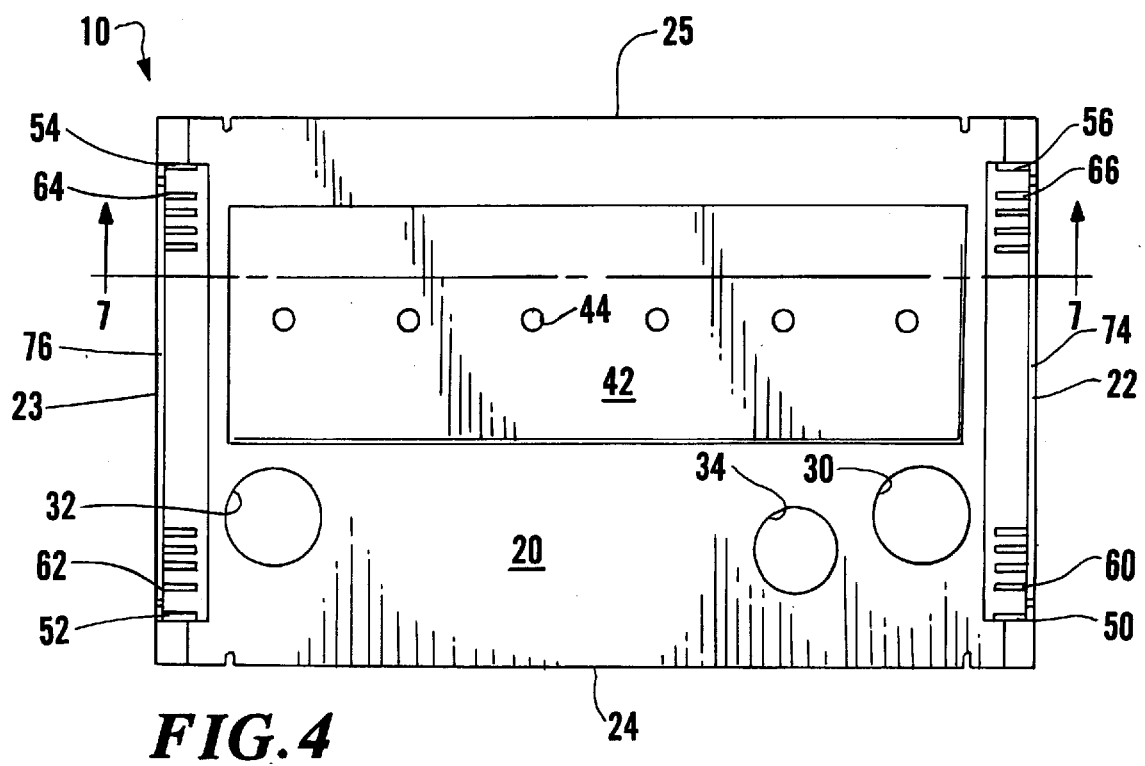
FIG. 4 is an elevated top view of the heat shield of FIG. 2.

Turning now to the drawings, in FIG. 1, there is shown a battery heat shield or enclosure 10 assembled onto a conventional battery container 12. In accordance with the invention, the heat shield 10 is a unitarily molded structure that surrounds the sides 14, 16, which are commonly referred to as the ends 14 and sides 16, and top 18 of the battery container 12 and snaps into its final assembled position on the battery container 12. A handle (not illustrated) may extend from the sides 16 of the battery 12 from the ends 14 of the battery 12. For the purposes of this disclosure, the terms "side" and "sidewall" will be used as generic terms for both sides and ends and sidewalls and end walls, respectively. The heat shield 10 includes a top portion 20, and sidewalls 22, 23, 24, 25 (see also FIG. 3).

Figure 2:
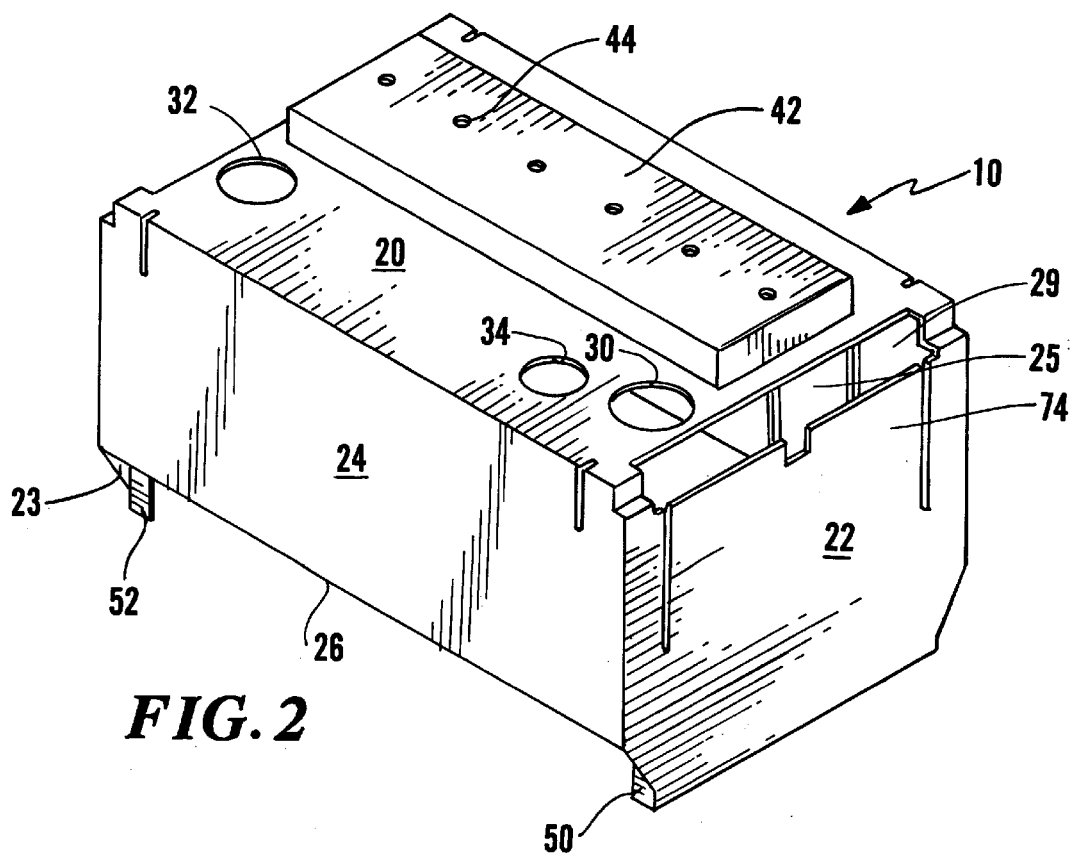
FIG. 2 is an enlarged perspective view of the heat shield of FIG. 1 showing the top of the heat shield.

According to an important feature of the invention, the lower edges 26 of the sidewalls 24, 25 include sufficient clearance for the use of conventional hold down hardware (not shown). As shown in the drawings, the sidewalls 24, 25 preferably include a cutout portion or are sufficiently short to expose the hold down shoulders 28 of a conventional battery design. In this way, when the battery container 12 is assembled into a vehicle engine, conventional mounting or hold down hardware may be utilized to bear directly against the battery 12 container itself, rather than against the heat shield, as in some prior art designs. It will thus be appreciated by those skilled in the art that the battery/heat shield subassembly need not be completely removed from the engine in order to remove the heat shield 10 from the battery container 12. The sidewalls 22, 23, 24, 25 may include strengthening ribs. In the embodiment illustrated, sidewalls 24, 25 are provided with strengthening ribs 29 (see FIGS. 2 and 3).

The top portion 20 of the heat shield 10 includes openings 30, 32, 34 to accommodate the battery terminals 36, 38, and substantially adjacent the battery state of charge indicator 40. It will be appreciated that one or more larger openings may be provided to accommodate the terminals 36, 38 and/or the state of charge indicator 40. For example, a single large rectangular opening may be provided through which each of the elements may be accessed. This or a separate opening might likewise permit viewing of a label or printed text on the top 18 of the battery container 12. In this way, the heat shield 10 does not obstruct access to the terminals 36, 38. Similarly, the heat shield 10 does not obstruct visual monitoring of the current state of charge of the battery 12.

Additionally, the top portion 20 preferably includes a raised portion 42 disposed adjacent the battery vents (not visible). The raised portion 42 includes a plurality of bores 44 for the escape of gases from the interior of the battery via the cell vents. It will be appreciated that the bores 44 permit the escape of gases, while the raised portion acts as a splash shield against possible acid expulsion from the battery under extreme operating conditions.

According to an important feature of the invention, an insulating layer of air is provided in spaces between the battery container 12 sidewalls 14, 16 and the heat shield 10 sidewalls 22–25. To space the heat shield 10 from the battery container 12 surface, ribs 50, 52, 54, 56 extend inward from the inside surfaces of the sidewalls 22, 23 of the heat shield 10. As may be seen in FIGS. 3–5 and 7, the ribs 50, 52, 54, 56 are disposed substantially adjacent the ends or sides 14 of the battery container 12 to limit the side to side movement of the shield 10 relative to the battery container 12. The ribs 29 on 24 likewise limit side-to-side movement in the opposite direction.

Preferably, spaces for insulating layers of air are provided around all sides 14, 16 of the battery container 12. It will be appreciated, however, that such spaces may be provided around less than all sides of the battery container 12 and still provide cooling of the battery.

Figure 7:
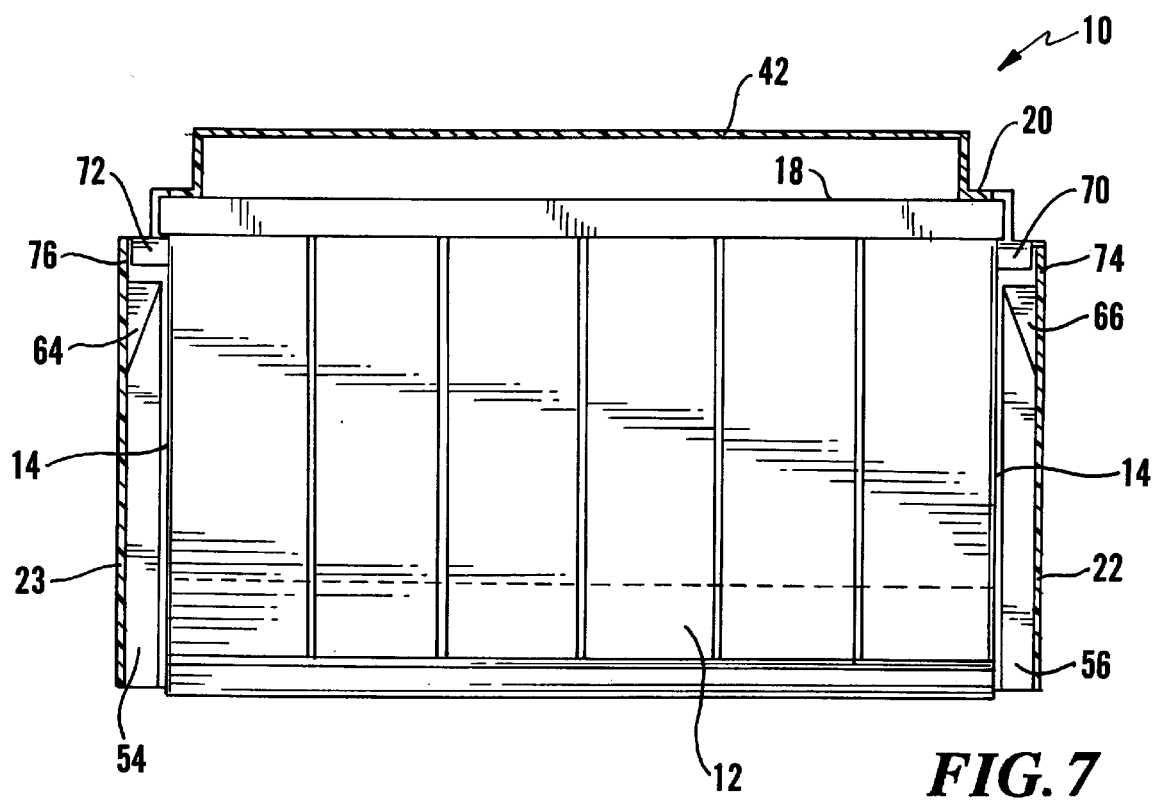
FIG. 7 is a cross-sectional view of the heat shield assembled onto the battery taken along line 7—7 of FIG. 4.
Figure 9:
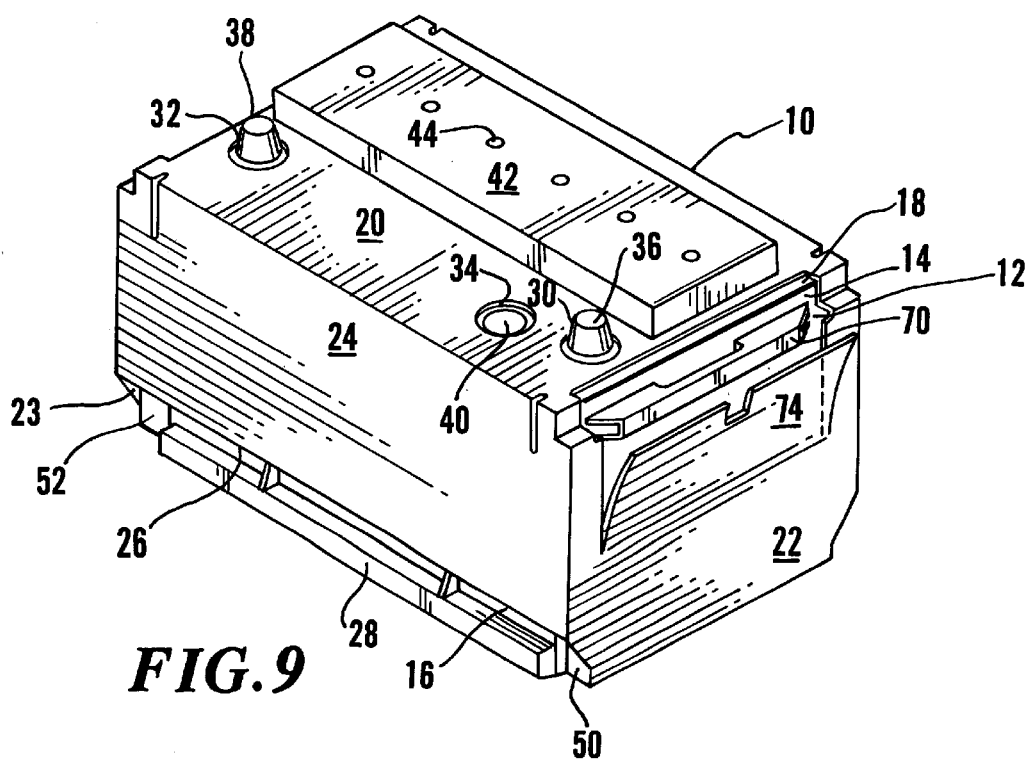
FIG. 9 is the heat shield of FIG. 1 with the heat shield coupling flaps flexed outward from the battery container end.

Accordingly to another important feature of the invention, the heat shield 10 snaps into place over the battery container 12. In order to so couple the heat shield 10 to the battery container 12, inwardly extending protrusions 60, 62, 64, 66 are provided along the inner surfaces of the heat shield sidewalls 22, 23. When assembled to the battery container 12, as shown in FIGS. 7 and 8, the protrusions 60, 62, 64, 66 are disposed below the standard handle bracket 70, 72 of the battery container 12. It will be appreciated that the protrusions 60, 62, 64, 66 engage the brackets 70, 72 to prevent the heat shield 10 from being lifted upward off of the battery container 12.

In the preferred embodiment, each protrusion 60, 62, 64, 66 is actually a series of parallelly disposed, thin ribs. It will be appreciated by those skilled in the art that this structure provides certain molding advantages.

In order to permit the heat shield 10 to slide downward over the battery container 12, resilient, cantilevered end flaps 74, 76 are provided in the heat shield sides 22, 23. Preferably, the protrusions 60, 62, 64, 66 are of a ramped structure. As the heat shield 10 is moved downward, the ramped protrusions 60, 62, 64, 66 ride along the handle brackets 70, 72 to cause the end flaps 74, 76 flex outward from the planer surface of the heat shield sides 22, 23. Once the ramped protrusions 60, 62, 64, 66 pass the handle brackets 70, 72, the resilient end flaps 74, 76 snap back into their original position, as shown in FIGS. 7 and 8 to couple the heat shield 10 to the battery container 12. In this position, at least a portion of the top portion 20 of the heat shield 10 is preferably disposed adjacent the top 18 of the battery container 12. In this way, the abutment of the top portion 20 of the heat shield 10 with the top 18 of the battery container 12, and the abutment of the protrusions 60, 62, 64, 66 with the handle brackets 70, 72, minimize upward and downward movement of the heat shield 10 relative to the battery container 12. Thus in order to assemble the heat shield 10 to the battery container 12, the user need only slide the heat shield 10 downward over the battery container 10 until the protrusions 60, 62, 64, 66 snap into place to couple the shield 10 to the battery container 12. The heat shield 10 is a single unit, and there are no latches required to couple the heat shield 10 to the battery container 12.

In order to remove the heat shield 10 from the battery container 12, the user need only flex the end flaps 74, 76 away from the battery container 12 to provide clearance for the heat shield 10 to be lifted upward. It will thus be appreciated by those skilled in the art that only a single user is required to disassemble the heat shield 10 from the battery container 12.

The heat shield 10 may be injection molded as a unitary structure by conventional molding techniques. The heat shield 10 is preferably made of a relatively rigid thermoplastic material, such as polypropylene, though other materials may be utilized.

We claim as our invention:

1. An enclosure for thermally insulating a storage battery for a motor vehicle from underhood heat, the battery including a casing having casing sidewalls, a casing top wall, and a casing bottom wall, and at least one handle bracket protruding from a casing sidewall, said enclosure comprising an enclosure top wall, and enclosure sidewalls having inner surfaces, said enclosure being dimensioned to slide downward over the battery casing to dispose the enclosure sidewalls substantially parallel to the casing sidewalls, and the enclosure top wall substantially parallel the casing top wall, at least one air space being created between at least one casing sidewall and one said inner surface of an enclosure sidewall to provide a thermal barrier, at least one enclosure sidewall comprising a coupling protrusion extending from an inner surface of at least one said enclosure sidewall, the enclosure coupling protrusion being disposed at least partially subjacent the handle bracket when the enclosure is disposed over the battery casing, the enclosure coupling protrusion engaging the handle bracket when an upward force is exerted on the enclosure to prevent the enclosure from being lifted off of the battery casing.

2. The enclosure of claim 1 wherein the at least one said enclosure sidewall further comprises a wall flap, the wall flap being coupled to the sidewall from its lower edge and cantilevering from the sidewall, the enclosure coupling protrusion protruding from the wall flap such that the wall flap cantilevers away from the casing sidewall as the enclosure is slid downward over the battery casing.

3. The enclosure of claim 2 wherein the coupling protrusion is a ramped structure, such that the coupling protrusion rides along the handle bracket as the enclosure is slid down over the battery casing, cantilevering the wall flap away from the battery casing sidewall, the coupling protrusion snapping in position subjacent the handle bracket to couple the enclosure to the battery casing once the coupling protrusion passes the handle bracket.

4. The enclosure of claim 3 wherein the coupling protrusion comprises a plurality of ribs.

5. The enclosure of claim 1 wherein the coupling protrusion is a ramped structure, such that the coupling protrusion rides along the handle bracket as the enclosure is slid down over the battery casing, cantilevering the wall flap away from the battery casing sidewall, the coupling protrusion snapping in position subjacent the handle bracket to couple the enclosure to the battery casing once the coupling protrusion passes the handle bracket.

6. The enclosure of claim 1 further comprising at least spacing protrusion extending from the inner surfaces of at least one of the enclosure sidewalls to create said air space.

7. The enclosure of claim 1 further comprising a plurality of spacing protrusions extending from the inner surfaces of opposed enclosure sidewalls to create said air spaces.

8. The enclosure of claim 2 further comprising a plurality of spacing protrusions extending from the inner surfaces of opposed enclosure sidewalls to create said air spaces.

9. The enclosure of claim 3 further comprising a plurality of spacing protrusions extending from the inner surfaces of opposed enclosure sidewalls to create said air spaces.

10. The enclosure of claim 1 wherein the battery casing further comprises at least two battery terminals, and the enclosure further comprising at least one bore for receiving said terminals.

11. The enclosure of claim 10 wherein the battery casing further comprises a state of charge indicator, and the enclosure further comprises a bore disposed substantially adjacent the state of charge indicator when the enclosure is disposed on the battery casing.

12. The enclosure of claim 1 wherein an airflow space is provided between the battery casing top wall and the enclosure top wall.

13. The enclosure of claim 1 wherein the battery casing top wall includes a plurality of vents, and the enclosure top wall includes a protrusion for receiving the vents when the enclosure is disposed on the battery casing.

14. The enclosure of claim 2 wherein the wall flap may be flexed outward from the casing sidewall to decouple the coupling protrusion from the handle bracket so the enclosure may be slid upward off of the battery casing.

15. The enclosure of claim 3 wherein the wall flap may be flexed outward from the casing sidewall to decouple the coupling protrusion from the handle bracket so the enclosure may be slid upward off of the battery casing.

16. The enclosure of claim 2 wherein the battery casing further comprises at least two battery terminals, and the enclosure further comprising at least one bore for receiving said terminals.

17. The enclosure of claim 16 wherein the battery casing further comprises a state of charge indicator, and the enclosure further comprises a bore disposed substantially adjacent the state of charge indicator when the enclosure is disposed on the battery casing.

18. The enclosure of claim 2 wherein the battery casing top wall includes a plurality of vents, and the enclosure top wall includes a protrusion for receiving the vents when the enclosure is disposed on the battery casing.

19. The enclosure of claim 2 wherein an airflow space is provided between the battery casing top wall and the enclosure top wall.

20. The enclosure of claim 4 wherein an airflow space is provided between the battery casing top wall and the enclosure top wall.

* * * * *